United States Patent
Fredriksson et al.

(10) Patent No.: US 10,752,201 B2
(45) Date of Patent: Aug. 25, 2020

(54) HINGE ARRANGEMENT

(71) Applicant: Volvo Car Corporation, Gothenburg (SE)

(72) Inventors: Anders Fredriksson, Gothenburg (SE); Syed Hidayath, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 127 days.

(21) Appl. No.: 16/217,127

(22) Filed: Dec. 12, 2018

(65) Prior Publication Data

US 2019/0241150 A1    Aug. 8, 2019

(30) Foreign Application Priority Data

Feb. 5, 2018   (EP) .................................... 18155082

(51) Int. Cl.
*B60R 21/38* (2011.01)
*B62D 25/12* (2006.01)
*E05D 11/10* (2006.01)

(52) U.S. Cl.
CPC .............. *B60R 21/38* (2013.01); *B62D 25/12* (2013.01); *E05D 11/1014* (2013.01); *E05Y 2900/536* (2013.01)

(58) Field of Classification Search
CPC ......... B60R 21/38; B62D 25/12; E05D 3/145; E05D 11/1014; E05Y 2900/536
See application file for complete search history.

(56) References Cited

U.S. PATENT DOCUMENTS

2014/0182962 A1*  7/2014  McIntyre, I ............ B60R 21/38
                                                                  180/274
2015/0167369 A1*  6/2015  Hwang ................... B60R 21/38
                                                                   16/233
(Continued)

FOREIGN PATENT DOCUMENTS

DE       102006010801 A1 *  9/2007  ............. B60R 21/38
DE        10200406210 B4 *  8/2009  ............. B60R 21/38
(Continued)

OTHER PUBLICATIONS

Jul. 9, 2018 European Search Report issue on International Application No. EP18155082.

*Primary Examiner* — Ruth Ilan
(74) *Attorney, Agent, or Firm* — Clements Bernard Walker; Christopher L. Bernard

(57) ABSTRACT

The present disclosure relates to a hinge arrangement of a vehicle, the hinge arrangement being transitable between a normal state and a deployed state. The hinge arrangement comprises a body portion, a bracket portion, a hinge portion and a deployment guiding element. The hinge portion comprises a first member and a second member, the deployment guiding element pivotally connecting the bracket portion and the first member of the hinge portion. The bracket portion is arranged to be in a fixed position relative to the first member during movement in a hinged connection. The bracket portion is arranged to be translationally displaced as a whole in relation to the first member of the hinge portion during the transition of the hinge arrangement between the normal state and the deployed state, the deployment guiding element being adapted to guide the transition and the hinged connection being inactive during the transition.

15 Claims, 7 Drawing Sheets

(56) References Cited

U.S. PATENT DOCUMENTS

| | | | | |
|---|---|---|---|---|
| 2016/0016533 A1* | 1/2016 | Lindmark | ............... | B62D 25/12 |
| | | | | 296/193.11 |
| 2016/0245003 A1* | 8/2016 | McIntyre | ................ | B60R 21/38 |
| 2017/0282847 A1* | 10/2017 | Jenny | ...................... | B60R 21/38 |
| 2018/0057068 A1* | 3/2018 | Leschnik | ............... | B62D 25/12 |
| 2018/0141516 A1* | 5/2018 | Hwang | .................. | B60R 21/38 |
| 2019/0061679 A1* | 2/2019 | Gabler | ................... | B60R 21/38 |

FOREIGN PATENT DOCUMENTS

| | | | | | |
|---|---|---|---|---|---|
| DE | 102009040413 | A1 * | 3/2011 | ............ | B60R 21/38 |
| DE | 102010029719 | A1 * | 12/2011 | ............ | E05D 3/145 |
| DE | 102015203432 | A1 * | 9/2016 | ............ | B60R 21/38 |
| EP | 2977273 | A1 | 1/2016 | | |
| EP | 3184375 | A1 | 6/2017 | | |
| EP | 3184376 | A1 * | 6/2017 | ............ | B60R 21/38 |
| EP | 3184377 | A1 * | 6/2017 | ............ | B60R 21/38 |

\* cited by examiner

HINGE ARRANGEMENT

CROSS-REFERENCE TO RELATED APPLICATION

The present patent application/patent claims the benefit of priority of co-pending European Patent Application No. 18155082.3, filed on Feb. 5, 2018, and entitled "HINGE ARRANGEMENT," the contents of which are incorporated in full by reference herein.

TECHNICAL FIELD

The present disclosure relates to a hinge arrangement for a cover of a vehicle, e.g. for a bonnet. The disclosure further relates to a bonnet arrangement comprising such a hinge arrangement, to a vehicle and to a method of transiting the hinge arrangement between a normal state and a deployed state.

BACKGROUND

If a motor vehicle, such as a car, is involved in an accident in which the front part of the vehicle hits a vulnerable road user, such as a pedestrian or a cyclist, it is not uncommon that the head of the vulnerable road user impacts on the bonnet of the vehicle. The vulnerable road user may in that case be severely injured. One parameter, which can affect the severity of the injury, is the fact that the bonnet, which is usually formed from a thin metal sheet, would tend to bend, and then deform on hard engine parts, such as an engine block, located in an engine compartment beneath the bonnet. In order to reduce the severity of these accidents, it is well-known to use a deployable bonnet. By displacing bonnet to a deployed position, also called a pop-up position, e.g. by raising the bonnet at least at its rear end, or at both the rear and front ends, the distance between the bonnet and the hard engine parts is increased, and thereby the consequences of such an impact are mitigated.

The bonnet is in American English known as a hood, but herein the British English term bonnet is used.

Patent document EP 2977273 B1 relates to a hinge arrangement adapted to be located at a rear end portion of a bonnet of a vehicle. The bonnet is displaceable between a closed position and a deployed position located at least upwards as compared to the closed position. The hinge arrangement is transitable between a normal position, corresponding to the bonnet being in the closed position, and a deployed position, corresponding to the bonnet being in the deployed position. The hinge arrangement comprises a hinge portion adapted to be attached, directly or indirectly, to a body of the vehicle, a bonnet portion adapted to be attached, directly or indirectly, to the bonnet, and a rear deployment guiding element adapted to control the transition of the hinge arrangement between the normal position and the deployed position. The hinge portion comprises one or more hinge pivot axes providing a hinged connection between the bonnet and the body of the vehicle allowing opening of the bonnet. The hinge portion comprises an upper portion being more distal to the body than the hinged connection. The bonnet portion is arranged to be in a fixed position relative to the upper portion of the hinge portion during opening of the bonnet. The bonnet portion as a whole is arranged to be translationally displaced at least upwards in relation to the upper portion of the hinge portion during a transition of the hinge arrangement between the normal position and the deployed position, the hinged connection being inactive during the transition, i.e. without any pivotal movement, the transition being controlled by the rear deployment guiding element.

SUMMARY

The object of the present disclosure is to provide an alternative or an improved hinge arrangement.

The present invention relates to a hinge arrangement adapted to be located at a front, a rear or a side end portion of a cover, e.g. a bonnet, of a vehicle. The hinge arrangement is transitable between a normal state and a deployed state. The hinge arrangement has a longitudinal direction, a transverse direction and a vertical direction. The hinge arrangement comprises a body portion, adapted to be attached, directly or indirectly, to a body of the vehicle or forming a part of the body, a bracket portion, adapted to be attached, directly or indirectly, to the cover, a hinge portion, providing a hinged connection between the body portion and the bracket portion, and a deployment guiding element. The hinge portion comprises a first member and a second member. The second member is pivotally connected to the first member, e.g. at or adjacent to a first end of the second member. Further, the second member is pivotally or fixedly connected to the body portion, e.g. at or adjacent to a second opposite end. The deployment guiding element pivotally connects the bracket portion and the first member of the hinge portion. The bracket portion is arranged to be in a fixed position relative to the first member during movement in the hinged connection. Further, the bracket portion is arranged to be translationally displaced as a whole at least in the vertical direction in relation to the first member of the hinge portion during the transition of the hinge arrangement between the normal state and the deployed state, the deployment guiding element being adapted to guide the transition and the hinged connection being inactive during the transition, i.e. no or substantially no pivotal movement in a pivot axis or a plurality of pivot axes of the hinged connection. The hinge arrangement further comprises a locking member pivotally connected to the first member, the locking member being adapted to in a first state lock the bracket portion in relation to the first member of the hinge portion and in a second state lock the first member of the hinge portion in relation to the body portion. The deployment guiding element and the locking member are connected to the first member by means of a common pivot axis.

The cover may be a bonnet covering an engine compartment at a front end portion of a vehicle, but the cover may also be located at a rear end portion or a side end portion of the vehicle. The cover may e.g. cover a load compartment.

The cover is displaceable between a closed position, corresponding to the normal state of the hinge arrangement, and a deployed position, corresponding to the deployed state of the hinge arrangement.

When the cover is a bonnet, the closed position of the cover is the normal position of the bonnet, which for example is used when driving the vehicle or parking the vehicle. The bonnet then covers the engine compartment. When a sensor system of the vehicle has determined a collision with a vulnerable road user or an imminent collision with a vulnerable road user, the bonnet may be displaced to the deployed position, thereby increasing the distance between the bonnet and any hard engine parts, and hence the consequences of such a collision are mitigated.

Preferably, the deployed position of the bonnet is located upwards and rearwards as compared to the closed position, but it would also be possible to have a deployed position being straight upwards as compared to the closed position. The directions, i.e. upwards, rearwards and forwards, are defined in relation to the body of the vehicle, assuming it is standing on a horizontal ground. The upward movement direction of the bonnet corresponds to the vertical direction of the hinge arrangement, while the rearwards movement direction of the bonnet corresponds to the longitudinal direction of the hinge arrangement. Preferably, the bonnet is also displaceable from the deployed position back to the closed position, such that the bonnet may be restored to the closed position after the deployed position has been activated.

To reach the deployed position, the rear end of the bonnet is raised and, as an option, also the front end. Hence the bonnet is raised as a whole, even if it usually is raised more at its rear end than at its front end. Thereby the bonnet is higher up in the deployed position than in the closed position, which helps to reduce the severity of an accident involving a vulnerable road user being thrown onto the bonnet.

The hinge portion provides the hinged connection, which may comprise a single pivot axis, but it would also be feasible with a multi-link hinged connection comprising a plurality of pivot axes and one or more link arms. The pivot axis/axes typically extend in the transverse direction, or at least substantially in the transverse direction, of the hinge arrangement. The hinge portion may be of any type known in the art. Further, for a multi-link hinged connection, there may be other portions or elements, such as link arms, in the hinge portion. The hinge portion may e.g. have a multi-link configuration.

The bonnet may assume an open position, which is not the same as the deployed position. The open position permits access to the engine compartment of the vehicle e.g. for service, maintenance or repair work. In order to reach the open position, the bonnet is pivoted in the hinged connection with one or more pivot axis/axes extending substantially in the transverse direction of the vehicle at or adjacent to the end portion of the bonnet. The open position of the bonnet arrangement as described herein can be reached without passing the deployed position.

The hinged connection allows access opening of the cover, e.g. to the open position. The access opening allows the user of the vehicle to access any component(s) covered by the cover. In case the cover is a bonnet, the access opening permits access to the engine compartment of the vehicle e.g. for service, maintenance or repair work. The component(s) does/do not necessarily have to include an engine. The cover may e.g. cover a load compartment.

The hinge portion may comprise one, two, three or more second members. It would also be feasible with more than one first member, e.g. two, three or more. The first and second members may form parts of a multi-link arrangement, in which case, there may be other portions or elements, such as link arms, e.g. located between the first and the second members.

The hinge arrangement as described herein provides a hinge arrangement with a low packaging height. This is realized by means of the relatively few components of the hinge arrangement, which may be packed in an efficient way. It is thereby possible to obtain a low total height of the hinge arrangement. Further, it is possible to obtain a low total width of the hinge arrangement. During manufacturing of the vehicle, there is thus room for manufacturing tools in the area of the hinge arrangement. The first member of the hinge arrangement may be used in a versatile way.

In addition, the hinge arrangement as described herein makes it possible for the bonnet to move upwards and optionally rearwards in relation to the windscreen of the vehicle. Thereby the bonnet may reach a deployed position, wherein its rear end portion is closer to the windscreen as compared to hinge arrangements according to prior art, when measured from the lower edge of the windscreen located furthest forward in the vehicle.

During access opening of the bonnet, the deployment guiding element is inactive, i.e. there is no or substantially no pivotal movement of the deployment guiding element. However, the deployment guiding element is active when the bonnet is displaced to its deployed position, by pivotal movement of the deployment guiding element. When in the deployed state of the hinge arrangement as described herein, the characteristics of the deployment guiding element may be selected to obtain the desired behaviour of the hinge arrangement in case a head of a vulnerable road user would impact with the bonnet, e.g. such that the hinge arrangement will collapse in a controllable way.

If the hinge arrangement as described herein is located at a rear end portion of the bonnet and hence operates on the rear end portion of the bonnet when deploying the bonnet, the hinge arrangement may as an option also be adapted to raise a front end portion of the bonnet at least upwards, preferably upwards and rearwards. In that case, the whole bonnet may be raised to reach the deployed position. The bonnet is then moved as a whole, although the actual displacements, e.g. given in millimetres, at the two end portions may differ. Raising the front end portion of the bonnet, or both end portions, may be advantageous in case the vulnerable road user hits a front portion of the bonnet, e.g. if the vulnerable road user is short, such as a small person or a child.

The hinge arrangement as described herein may, as an alternative or a complement, be located at a front end portion of the bonnet and hence operate on the front end portion when deploying the bonnet. In that case, the rear end portion may be deployable by means of its own lifting member, such that the whole bonnet may be raised when in the deployed position.

When the hinge arrangement as described herein is mounted in a vehicle, the first member of the hinge portion is closest to the bracket portion. The first member is thus connected via the second member and possibly other components to the body of the vehicle.

The bracket portion as a whole is arranged to be translationally displaced at least in the vertical direction of the hinge arrangement, i.e. upwards in relation to the vehicle, in relation to the first member of the hinge portion during the transition of the hinge arrangement between the normal state and the deployed state. Preferably the bracket portion is translationally displaced both in the vertical and longitudinal directions in a combined movement, i.e. upwards and rearwards in relation to the vehicle, but it would also be possible to displace it straight upwards, or upwards and forwards in relation to the vehicle. The transition of the hinge arrangement as described herein is guided by the deployment guiding element. The deployment guiding element is adapted to guide the movement of the bracket portion in relation to the hinge portion, in particular in relation to its first member.

The deployment guiding element may be directly or indirectly connected to the bracket portion and to the first member of the hinge portion. In the normal state of the hinge arrangement, the deployment guiding element extends mainly in the corresponding direction as the bracket portion.

Hence, for a closed bonnet, the deployment guiding element extends mainly in the longitudinal direction.

The deployment guiding element may be configured to substantially deform in a plane extending in the longitudinal direction and the vertical direction of the hinge arrangement. Preferably, the deployment guiding element is configured to deform in that plane only, e.g. by bending and/or buckling in the plane. The plane extends in the longitudinal and vertical directions of the hinge arrangement, such that both of these directions lie in that plane and the transverse direction is perpendicular to that plane. By this configuration of the hinge arrangement, deformation in the transverse direction of the hinge arrangement is avoided or substantially avoided. Hence, the deployment guiding element may substantially deform in the space between the first member of the hinge portion and the bracket portion, e.g. by bending in the available space. Thereby the head injury risk of a person colliding with the vehicle is reduced, e.g. as determined by HIC values, i.e. Head Injury Criterion Values. Further, the service cost may be reduced.

The deployment guiding element and the locking member are typically located between the bracket portion and the first members as seen in the transverse direction of the hinge arrangement.

The deployment guiding element may comprise a single arm, preferably with a fixed length, resulting in that the deployment guiding element is not configured to slide in relation to any other element of the hinge arrangement. The deployment guiding element may have a length in the range of from 10 mm to 200 mm, as measured between its pivot axes connecting it to the bracket portion and to the first member of the hinge portion, respectively, preferably in the range of from 20 mm to 180 mm, more preferably in the range of from 30 mm to 160 mm.

Even if a multi-link deployment guiding element is feasible, it may be preferred to have a single arm, since that keeps the number of components in the hinge arrangement at a low number.

The locking member is typically located at a central region of the first member, i.e. within +/−40% or +/−25% of the length of the first arm, as seen from the geometrical centre point of the first member.

The locking member may comprise a first lock portion adapted to cooperate with the bracket portion in the first state of the locking member, e.g. a first hook adapted to hold the bracket portion down as seen in the vertical direction, the vertical direction relating to the closed position of the cover. The first lock portion thus helps to retain the bracket portion in the fixed position relative to the first member during movement in the hinged connection. Further, the locking member is also in its first state during access opening of the cover, e.g. when opening the bonnet to get access to the engine compartment.

The locking member may be biased towards the first state, e.g. spring-biased, such as by means of a coil spring.

As an alternative or a complement, the locking member may be held by friction in the first state. Purely as an example, there may be friction between the above-mentioned first hook and the bracket portion, which friction has to be overrun before the hook can move in relation to the bracket portion.

The deployment guiding element may be pivotally connected to the bracket portion at or adjacent to a first end of the bracket portion. The bracket portion may also extend further in the forward direction of the vehicle. Anyway, the deployment guiding element is connected to the bracket portion at a position, which is spaced apart from the location where the first lock portion cooperates with the bracket portion. The distance between the location, where the first lock portion cooperates with the bracket portion, and the pivotal connection of the deployment guiding element to the bracket portion may correspond to the length of the deployment guiding element compensated for the distance between the first lock portion and the above-mentioned common pivot axis connecting the locking member and the deployment guiding element to the first member.

The locking member may comprise a second lock portion, e.g. a second hook, adapted to cooperate with the body portion in the second state of the locking member to thereby prevent the first member from moving upwards in the vertical direction in relation to the body portion. The second lock portion thus helps to retain the first member in a fixed position to the body portion, when the cover is moved to the deployed position by means of pivotal movement of deployment guiding element.

The body portion may comprise a locking flange protruding in the transverse direction, the second lock portion being adapted to cooperate with the locking flange, e.g. by the second hook being adapted to receive and retain the locking flange.

The second hook may comprise an elongated member having a first surface, the first surface being adapted to slide against the locking flange during the transition of the hinge arrangement between the normal state and the deployed state.

The hinge arrangement may comprise a lifting member adapted to operate on the locking member to provide the translational displacement of the bracket portion at least in the vertical direction in relation to the first member of the hinge portion during the transition of the hinge arrangement between the normal state and the deployed state.

The lifting member is adapted to directly or indirectly operate on the locking member. The lifting member may be a piston released by pyrotechnics or may operate mechanically or electro-mechanically.

The lifting member may be attached to the vehicle body. Further, the lifting member may be located either laterally inside of or outside of the first member as seen in the transverse direction of the hinge arrangement. The locations laterally inside of and laterally outside of relate to when the hinge arrangement is mounted in the vehicle, laterally inside of meaning that the location is closer to a longitudinal centreline of the vehicle. The lifting member may be located straight below the locking member.

The locking member may comprise an impact surface, the lifting member being adapted to operate on the locking member by pushing on the impact surface.

The locking flange may be configured such that once it has reached into the second hook during the transition of the hinge arrangement between the normal state and the deployed state and thereby secured the first member in relation to the body portion, the lifting member is configured to start transferring deployment energy via the locking member pushing on the deployment guiding element. The deployment guiding element then pivots at both its ends, thereby raising the bracket portion as a whole upwards, and preferably also rearwards. At the same time, the locking flange moves further into the second hook, e.g. until the locking flange reaches a bottom of the second hook. Since the locking flange thereby is retained within the second hook, the risk of bouncing back of the bonnet is avoided or at least reduced.

The first member of the hinge portion may comprise support, e.g. a protruding member such as a flange or rivet, which support is adapted to support the bracket portion at least in the vertical direction, preferably in both the vertical and the transverse direction, in the first state of the locking member, e.g. when pressed down by the first hook. Preferably the support is adapted to support a second end of the bracket portion, which is opposite to the above-mentioned first end. As an alternative or a complement, the first end of the bracket portion may be supported by the first member in the in the first state of the locking member.

The deployment guiding element and the locking member mainly extend in the plane extending in the longitudinal direction and the vertical direction of the hinge arrangement. However, in the hinge arrangement as described herein, the locking member and/or the deployment guiding element may extend also in the transverse direction of the hinge arrangement, such that the locking member and the deployment guiding element intersect each other or at least partly overlap, when seen from above in the vertical direction. This helps to transfer energy from the lifting member via the locking member to the deployment guiding element.

The first member of the hinge portion may comprise a stopper protruding in the transverse direction of the hinge arrangement. The stopper is adapted to provide an end of the movement of the deployment guiding element at the transition of the hinge arrangement between the normal state and the deployed state. Thereby the bonnet will be in a more stable position when deployed, which helps to reduce, or preferably avoid, the risk of bouncing back of the bonnet.

As mentioned above, it is preferred that the bracket portion moves both upwards and rearwards to the deployed position. In that case the deployment guiding element is pivoted to a position being a bit further than straight upwards, e.g. in the range of 0-10 degrees further. The stopper is then located such that it provides an appropriate end of this displacement.

The present invention also relates to a bonnet arrangement for a vehicle, the bonnet arrangement comprising a bonnet being displaceable between a closed position and a deployed position located at least upwards, preferably upwards and rearwards, as compared to the closed position, and a hinge arrangement as described herein. The bracket portion of the hinge arrangement is attached, directly or indirectly, to the bonnet.

The rear end portion of the bonnet may be adapted to be displaced rearwards by a longitudinal distance $d_{xr}$ being in the range of 20 mm $\leq d_{xr} \leq$ 200 mm, preferably 40 mm $\leq d_{xr} \leq$ 180 mm, more preferably 60 mm $\leq d_{xr} \leq$ 160 mm in relation to the body of the vehicle during the displacement from the closed position to the deployed position. Further, the rear end portion may be adapted to be displaced upwards by a vertical distance $d_{zr}$ being in the range of 10 mm $\leq d_{zr} \leq$ 170 mm, preferably 20 mm $\leq d_{zr} \leq$ 150 mm, more preferably 30 mm $\leq d_x \leq$ 130 mm in relation to the body of the vehicle during the displacement from the closed position to the deployed position. The distances $d_{xr}$ and $d_{zr}$ are determined at the centre of the location where the bracket portion is attached to the deployment guiding element. Thereby, it is possible to provide a large enough gap in the deployed position between the bonnet and any hard engine parts. Further, in the case of using the deployed position to provide partial access to the engine compartment, there will be enough room to provide vehicle components with vehicular liquid.

The present invention further relates to a vehicle comprising a hinge arrangement as described herein or a bonnet arrangement as described herein.

The present invention furthermore relates to method of transiting a hinge as described herein between the normal state and the deployed state. The method comprises first locking the first member of the hinge portion in relation to the body portion by means of the locking member, thereafter translationally displacing the bracket portion as a whole at least in the vertical direction in relation to the first member of the hinge portion.

The method may be performed when a sensor system of the vehicle has determined a collision with a vulnerable road user or an imminent collision with a vulnerable road user. The lifting member may then be activated and act on the locking member. Thereby, the locking member is displaced from its first state towards its second state. Once the first member is locked in relation to the body portion, the lifting member may start transferring deployment energy via the locking member pushing on the deployment guiding element. The deployment guiding element than pivots at both its ends, thereby raising the bracket portion as a whole at least upwards and preferably also rearwards.

Hence, the locking member rotates independently, i.e. without any contact to the deployment guiding element, at the start of the transition to the deployed state and the deployment guiding element starts to rotate after having contact with the locking member, which is transferring the force from the lifting member.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

Figure 1:
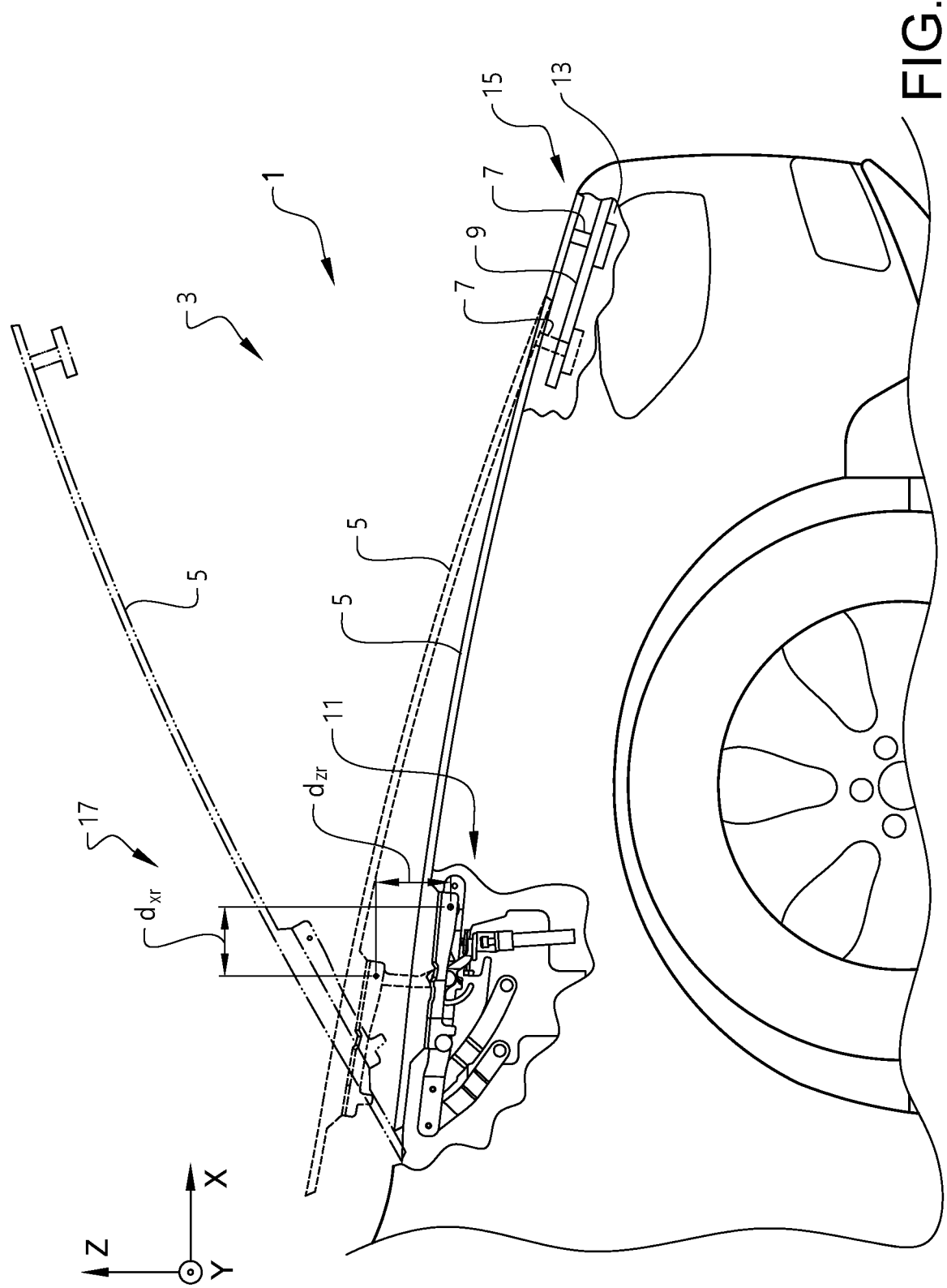
FIG. 1 is a schematic side view of a bonnet arrangement with a hinge arrangement according to the invention, showing a bonnet in a closed, an open and a deployed position, respectively.

FIG. 1 schematically illustrates a bonnet arrangement 1 of a vehicle 3 according to the invention. The vehicle in this case is a car. The bonnet arrangement 1 comprises a bonnet 5, a striker 7, a latch 9 and a hinge arrangement 11. The bonnet 5 is connected to a body 13 of the vehicle 3 by the striker 7 and the latch 9 at a front end portion 15 of the bonnet 5, and by the hinge arrangement 11 at a rear end portion 17 of the bonnet 5. The hinge arrangement 11 will be further described below in conjunction with FIGS. 2-5.

The directionality of the hinge arrangement 11 corresponds to the directionality of the vehicle 3, such that a longitudinal direction x of the hinge arrangement 11 corresponds to a longitudinal direction of the vehicle 3, a transverse direction y of the hinge arrangement 11 corresponds to a transverse direction of the vehicle 3 and a vertical direction z of the hinge arrangement 11 corresponds to a vertical direction of the vehicle 3, assuming the vehicle 3 is standing on a horizontal ground.

The bonnet 5 is shown in a closed position, see continuous line, in a deployed position, see dashed line, and in an open position, see dash-dotted line.

The closed position of the bonnet 5 is used during normal driving of the vehicle 3 and during parking of the vehicle 3.

The open position of the bonnet 5, as indicated by the dash-dotted line in FIG. 1, permits access to the engine compartment, e.g. for service, maintenance or repair work. In order to reach the open position, the bonnet 5 is pivoted at or adjacent to its rear end portion 17 by means of the hinge arrangement 11. The bonnet 5 is then displaced directly from the closed position to the open position without passing the deployed position. When closing the bonnet 5 again from the open position, the opening displacement may be reversed.

The bonnet 5 is also displaceable from the closed position to the deployed position. As already mentioned above in the background section, it is well-known to use a deployable bonnet in a vehicle. By raising the bonnet 5 to the deployed position, also called the pop-up position, the distance between the bonnet 5 and any hard engine parts is increased, thereby reducing the severity of an accident involving a vulnerable road user being thrown onto the bonnet 5. As an option, the bonnet arrangement of the invention may also raise the front end portion 15 of the bonnet 5 in order to reach the deployed position. This may be advantageous if the vulnerable road user hits a front portion of the bonnet 5, which e.g. may be the case, if the vulnerable road user is short, e.g. a short person or a child.

When being displaced from the closed position to the deployed position, the bonnet 5 of the illustrated embodiment moves simultaneously upwards in the z-direction and rearwards in the x-direction. In the illustrated embodiment, not only the rear end portion 17, but also the front end portion 15, is displaced. Preferably, the bonnet 5 is also displaceable from the deployed position back to the closed position, such that the bonnet arrangement 1 may be restored to the closed position after the deployed position has been activated.

The rear end portion 17 of the bonnet 5 may be adapted to be displaced rearwards by a longitudinal distance $d_{xr}$ being in the range of 20 mm$\leq d_{xr} \leq$200 mm, preferably 40 mm$\leq d_{xr} \leq$180 mm, more preferably 60 mm$\leq d_{xr} \leq$160 mm in relation to the body 13 of the vehicle 3 during the displacement from the closed position to the deployed position. Further, the rear end portion 17 may be adapted to be displaced upwards by a vertical distance $d_{zr}$ being in the range of 10 mm$\leq d_{zr} \leq$170 mm, preferably 20 mm$\leq d_{zr} \leq$150 mm, more preferably 30 mm$\leq d_{xr} \leq$130 mm in relation to the body 13 of the vehicle 3 during the displacement from the closed position to the deployed position. The distances $d_{xr}$ and $d_{zr}$ are determined where a bracket portion is attached to a deployment guiding element of the hinge arrangement 11 and reflect the displacements within the hinge arrangement 11. The bracket portion and the deployment guiding element are further described below.

One pair of a striker 7 and a latch 9 may be used. In that case, the pair is preferably located at or adjacent to the centre of the front end portion 15 of the bonnet 5. Often, there are two pairs of a striker 7 and a latch 9, e.g. at or adjacent to each lateral side of the front end portion 15 of the bonnet 5.

Usually, there is one hinge arrangement 11 at or adjacent to each lateral side of the rear end portion 17 of the bonnet 5. However, one, two, three or more hinge arrangements may be used.

In the embodiment of FIG. 1, the striker 7 is attached to the bonnet 5, while the latch 9 is attached to the body 13 of the vehicle 3. As an alternative, not illustrated, the striker 7 may be attached to the body 13 of the vehicle 3 and the latch 9 to the bonnet 5. In any case, the striker 7 and the latch 9 are located such that they can cooperate with each other, when the bonnet 5 is in the closed position and the deployed position, respectively.

As an alternative to displacing both the front end portion 15 and the rear end portion 17 when going to the deployed position of the bonnet 5, the front end portion 15 may remain in a relative position similar to that of the closed position of the bonnet 5, while only displacing the rear end portion 17.

The hinge arrangement 11 as described herein provides a hinge arrangement with a low packaging height.

In addition, the hinge arrangement 11 and the bonnet arrangement 1 as described herein make it possible for the bonnet 5 to move upwards and rearwards in relation to the windscreen of the vehicle 3. Thereby the bonnet 5 may reach a deployed position, wherein its rear end portion 17 is closer to the windscreen as compared to hinge arrangements according to prior art, when measured from the lower edge of the windscreen located furthest forward in the vehicle 3.

FIGS. 2-5 illustrate an embodiment of a hinge arrangement 11 according to the invention, e.g. the hinge arrangement 11 at the rear end portion 17 of the bonnet 5 of FIG. 1.

Figure 2A:
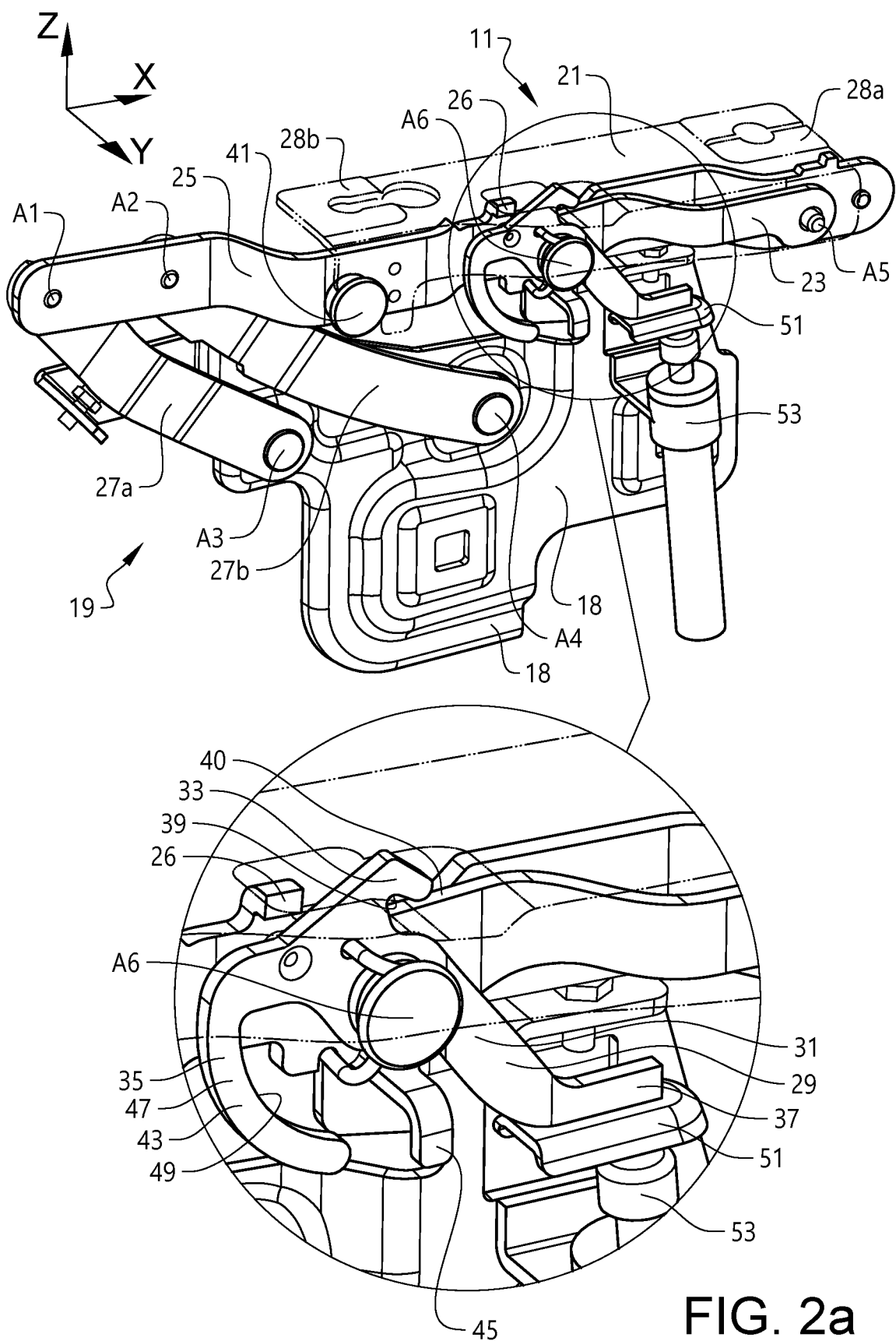
FIG. 2a-b are perspective views of the hinge arrangement of FIG. 1 in a normal state.
Figure 2B:
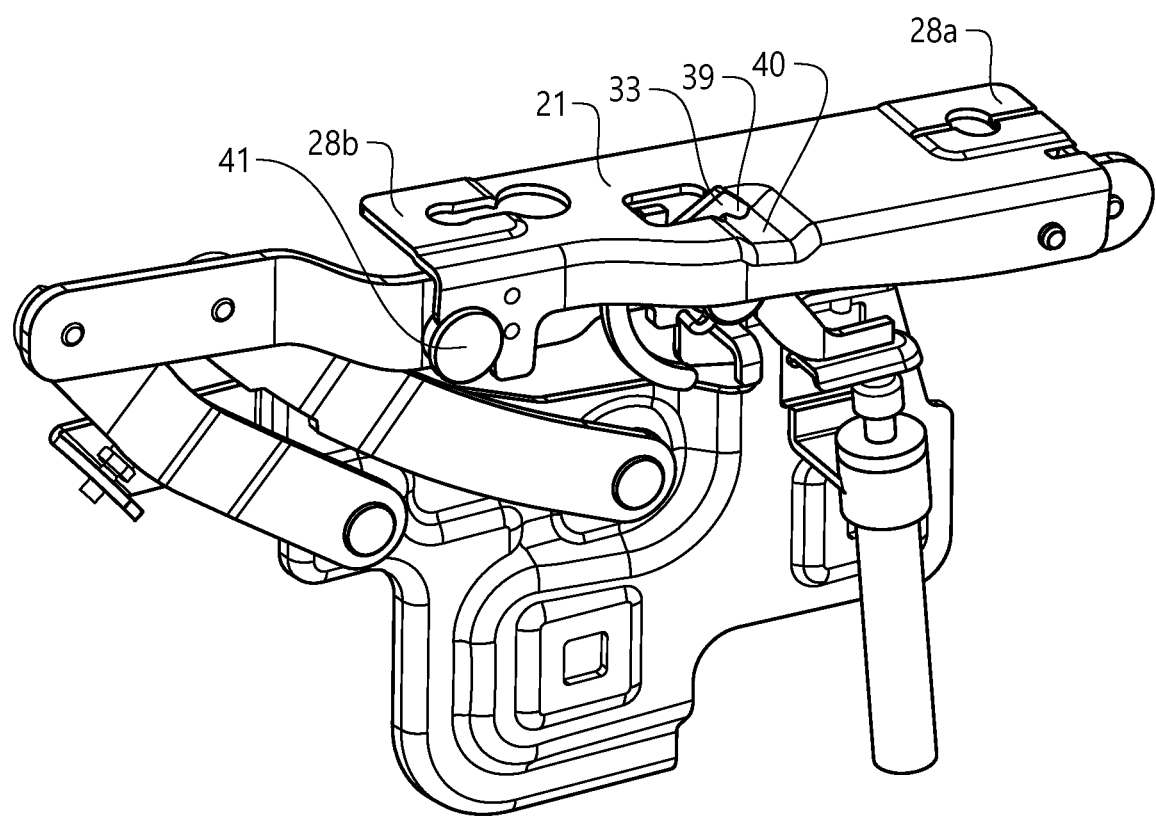
Figure 3:
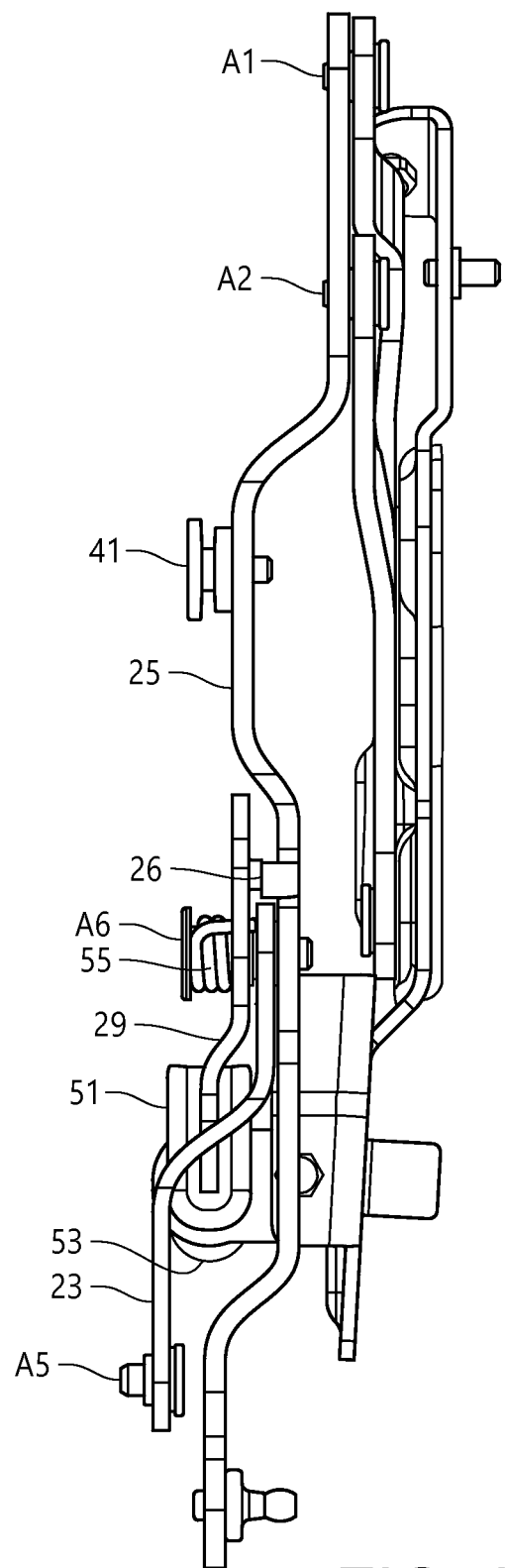
FIG. 3 is a top view of the hinge arrangement of in the normal state
Figure 4A:
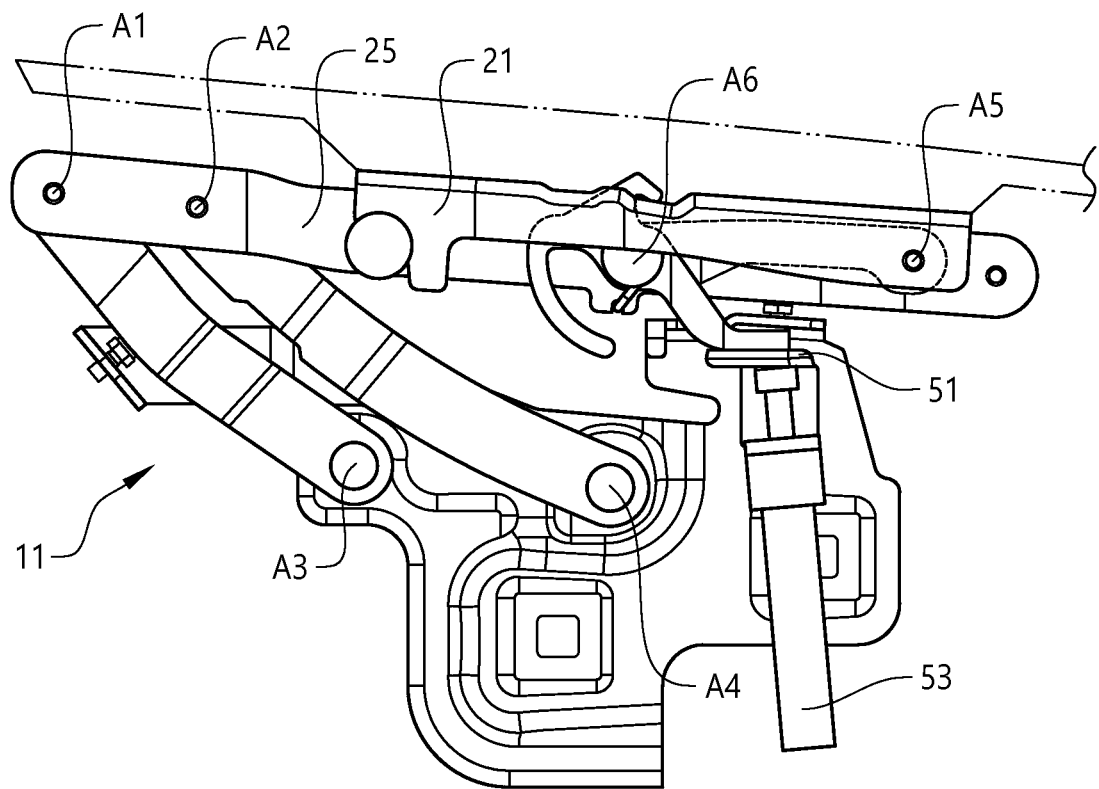
FIG. 4a-c illustrate the hinge arrangement during transition to the deployed state.
Figure 4B:
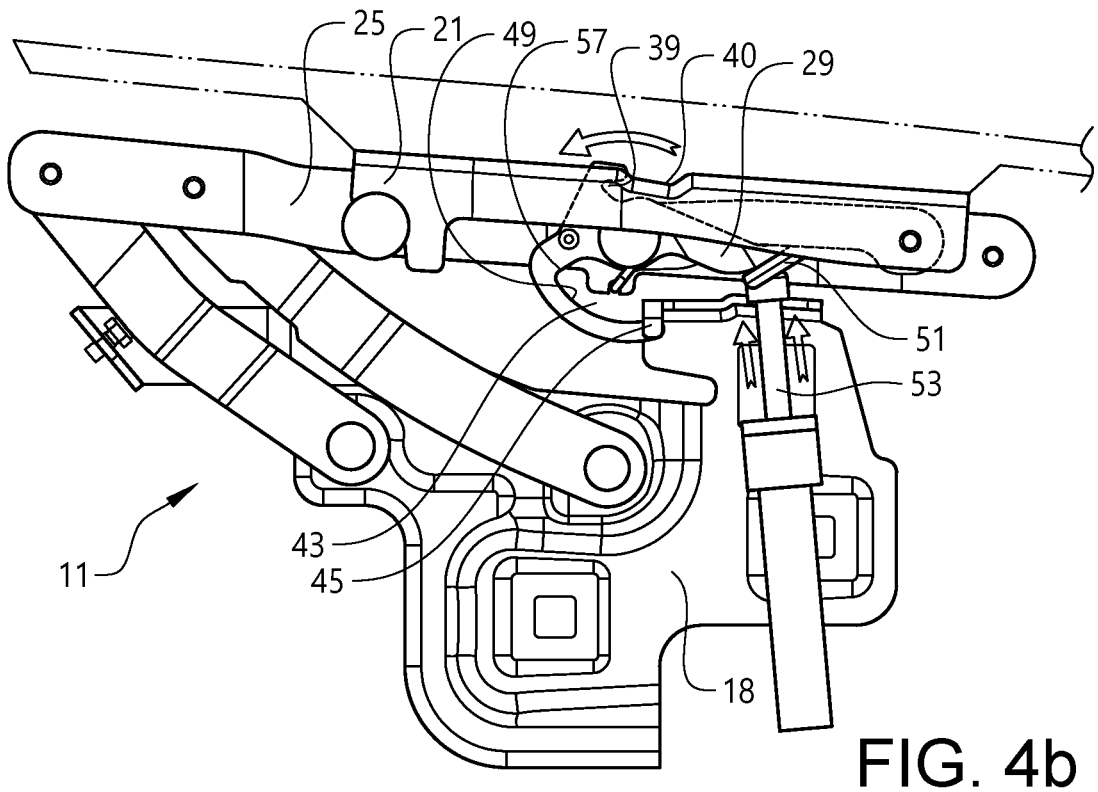
Figure 4C:
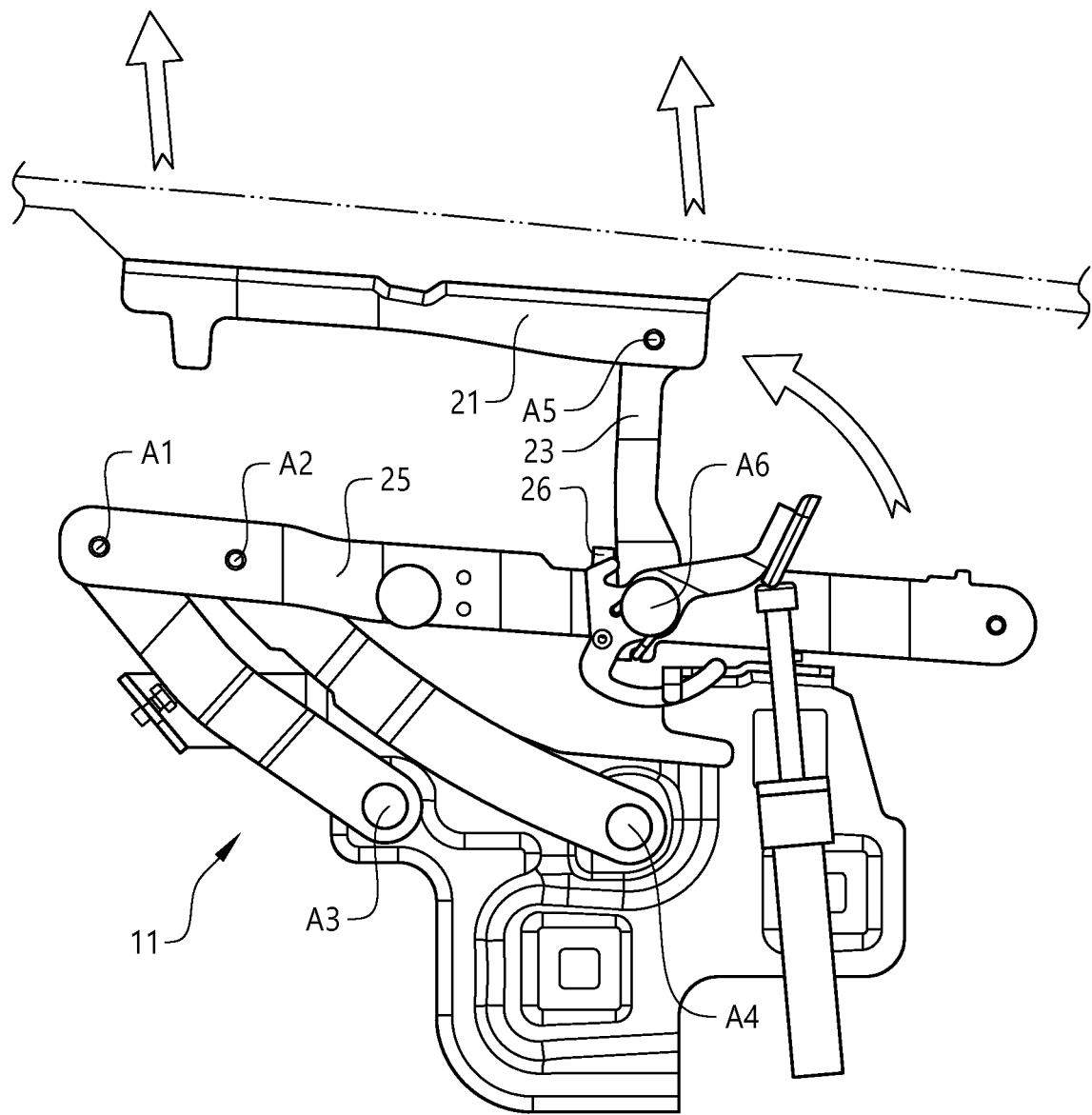

The hinge arrangement 11 is transitable between a normal state, illustrated in FIGS. 2a, 2b and 3, corresponding to the bonnet 5 being in the closed position, and a deployed state, illustrated in FIG. 4c, corresponding to the bonnet 5 being in the deployed position. FIGS. 4a and 4b illustrate the hinge arrangement 11 during the transition. In the open position of the bonnet 5, illustrated in FIG. 5, and during transition between the closed position and the open position of the bonnet 5, the hinge arrangement 11 is in its normal state.

As may best be seen in FIGS. 2a and 2b, the hinge arrangement 11 comprises a body portion 18, adapted to be attached, directly or indirectly, to the body 13 of the vehicle 3, or forming a part of the body 13 of the vehicle 3, a hinge portion 19, a bracket portion 21, adapted to be directly or indirectly attached to the bonnet 5, and a deployment guiding element 23, the functions of which are further described below. In FIG. 2a, the bracket portion 21 is indicated by point-dashed lines for improved visibility of the interior of the hinge arrangement 11, while FIG. 2b shows the bracket portion 21 as is.

Figure 5:
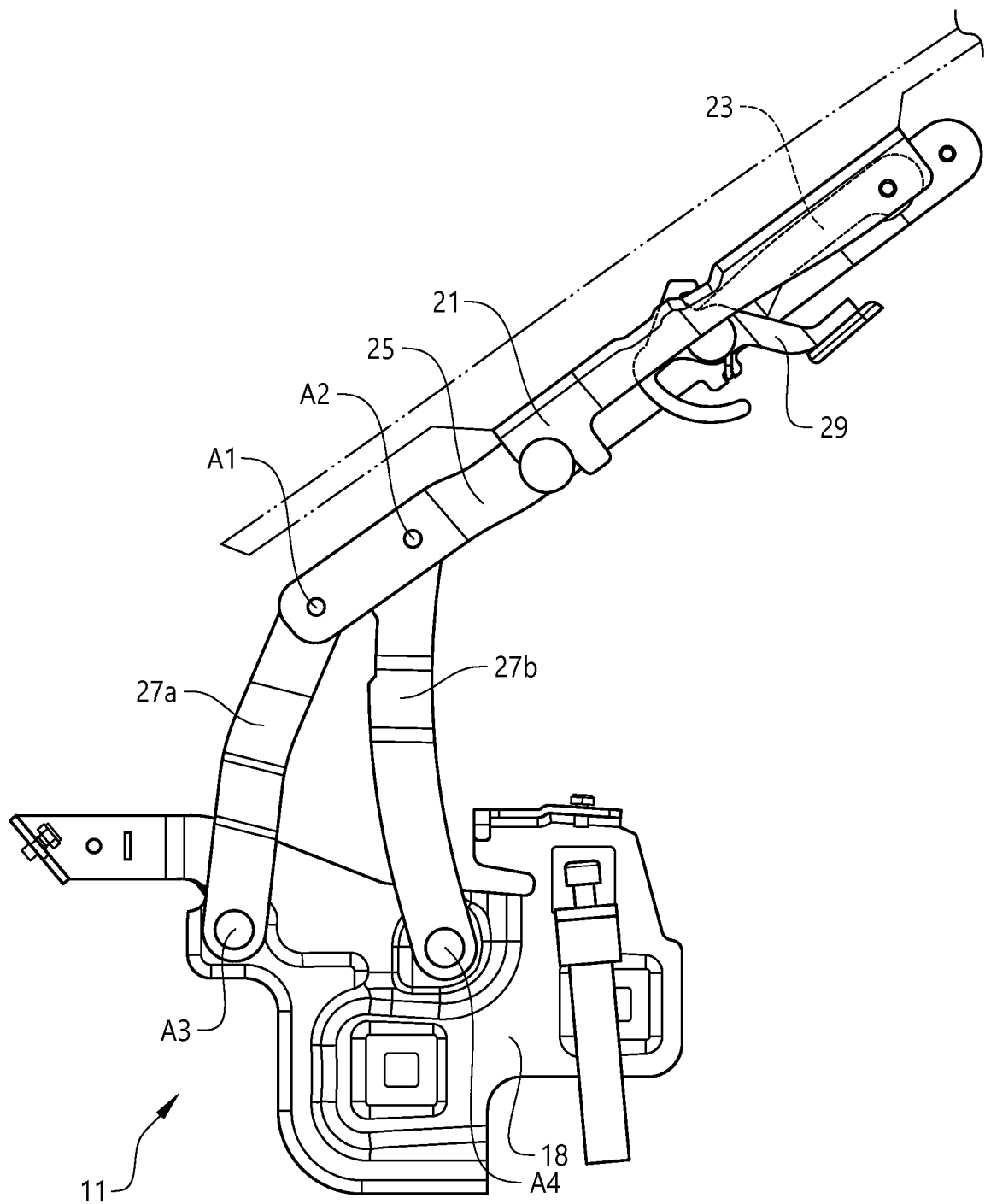
FIG. 5 is a side view of the hinge arrangement with the bonnet in the open position and the hinge arrangement in the normal state.

The hinge portion 19 provides a hinged connection between the body portion 18 and the bracket portion 21 allowing access opening of the bonnet 5, cf. FIG. 5. The hinge portion 19 comprises a first member 25, being closest to the bracket portion 21, and two second members 27a, 27b, being closest to the body portion 18. The second members 27a, 27b are pivotally connected to the first member 25 at first ends of the second members 27a, 27b by first and second pivot axes A1, A2. Further, the second members 27a, 27b are pivotally connected to the body portion 18 at second opposite ends of the second members 27a, 27b by third and fourth pivot axes A3, A4. The first, second, third and fourth pivot axes A1, A2, A3, A4 provide the above-mentioned hinged connection between the bonnet 5 and the body 13 of the vehicle 3 allowing access opening of the bonnet 5 for maintenance, service and repair, cf. FIG. 5.

Even if the illustrated embodiment discloses two second members 27a, 27b, it would also be feasible with a single second member. It would also be feasible with more than one first member 25. The first and second members may form parts of a multi-link arrangement, in which case, there may be other portions or elements, such as link arms, located between the first and the second members.

The first member 25 comprises a stopper 26, which protrudes in the transverse direction y. The stopper 26 is adapted to stop the rotation of the deployment guiding element 23 when going to the deployed state of the hinge arrangement 11, which is further described below in conjunction with FIGS. 4a-c.

The deployment guiding element 23, being constituted by a single arm with a fixed length, is adapted to guide the transition of the hinge arrangement 11 between the normal state and the deployed state. The deployment guiding element 23 is pivotally connected at one end to a first end 28a of the bracket portion 21 at a fifth pivot axis A5 and at an opposite end to the first member 25 of the hinge portion 19 at a sixth pivot axis A6. The deployment guiding element 23 may have a length in the range of from 10 mm to 200 mm as measured between the pivot axes A5, A6, preferably in the range of from 20 mm to 180 mm, more preferably in the range of from 30 mm to 160 mm.

During the transition from the normal state of the hinge arrangement 11, illustrated in FIGS. 2a and 2b, corresponding to the bonnet 5 being in the closed position, to the deployed state of the hinge arrangement 11, illustrated in FIG. 4c, corresponding to the bonnet 5 being in the deployed position, pivoting occurs in the fifth and sixth pivot axes A5, A6. However, the first, second, third and fourth pivot axes A1, A2, A3, A4 are inactive during this transition, i.e. there is no, or substantially no, pivotal movement in the hinged connection, i.e. in the first, second, third and fourth pivot axes A1, A2, A3, A4. On the other hand, during access opening of the bonnet 5, the fifth and sixth A5, A6 pivot axes are inactive, and pivoting occurs at the first, second, third and fourth pivot axes A1, A2, A3, A4, cf. FIG. 5.

The hinge arrangement 11 further comprises a locking member 29, which may assume a first state, as is illustrated in FIGS. 2a, 2b, 3 and 5, or a second state, as is illustrated in FIG. 4c, while FIGS. 4a and 4b illustrates a transition between the two states of the locking member 29.

In the first state, the locking member 29 locks the position of the bracket portion 21 in relation to the first member 25 of the hinge portion 19, such that there is no or substantially no pivotal movement at the fifth and sixth A5, A6 pivot axes.

In the second state, the locking member 29 locks the position of the first member 25 of the hinge portion 19 in relation to body portion 18, i.e. their positions in relation to each other are fixed, such that there is no or substantially no pivotal movement at the hinged connection of the hinge arrangement 11 at the first, second, third and fourth pivot axes A1, A2, A3, A4.

The locking member 29 is pivotally connected to the first member 25 by the same axis as the deployment guiding element 23, i.e. the sixth pivot axis A6, which is located at a central portion 31 of the locking member 29. The locking member 29 further comprises three leg-shaped portions 33, 35, 37 extending from the central portion 31. This is best seen in the detailed view of FIG. 2a.

The first leg-shaped portion 33 of the locking member 29 comprises a first lock portion constituted by a first hook 39, which is adapted to hold the bracket portion 21 down against the first member 25 of the hinged portion 19 in the first state of the locking member 29, see FIGS. 2a and 2b. Thereby the first hook 39 pushes on an abutment 40 of the bracket portion 21, which is best seen in FIG. 2b. The first end 28a of the bracket portion 21 rests on the first member 25 while being pressed down by the first hook 39. The first member 25 comprises a support in the form of a protruding member 41 here being a rivet, which supports a second end 28b of the bracket portion 21 while being pressed down by the first hook 39. The locking member 29 is in the illustrated embodiment spring-biased towards the first state. Hence, in the first state of the locking member 29, the locking member 29 retains the bracket portion 21 in a fixed position relative to the first member 25 of the hinge portion 19, which is most easily seen in FIGS. 2a and 2b.

The second leg-shaped portion 35 of the locking member 29 comprises a second lock portion constituted by a second hook 43, which is open in an obliquely downward direction in the first state and with a closed bonnet 5, as may be seen in the detail of FIG. 2a. The second hook 43 is, in the second state of the locking member 29, adapted to grip around a corresponding locking flange 45 protruding in the transverse direction y from the main part of the body portion 18, which is further described below.

The second hook 43 comprises an elongated member 47 having a first surface 49. During the transition of the hinge arrangement 11 between the normal state and the deployed state, which is further described below, the first surface 49 slides against the locking flange 45.

The locking member 29 further comprises an impact surface 51 at the third leg-shaped portion 37 of the locking member 29. The impact surface 51 forms an abutment for a lifting member 53, e.g. a piston, which may be released by e.g. pyrotechnics. When the lifting member 53 is activated, e.g. when a sensor system of the vehicle 3 has determined a collision with a vulnerable road user or an imminent collision with a vulnerable road user, the lifting member 53 operates on the impact surface 51 to transit the hinge arrangement 11 to the deployed state. Thereby, the bracket portion 21 is displaced upwards and rearwards in a displacement governed by the deployment guiding element 23, causing the bonnet 5 to be displaced to its deployed position, see FIG. 4c.

As mentioned above, the locking member 29 is spring-biased towards the first state. This is illustrated in FIG. 3, showing that a coil spring 55 forces the locking member 29 to the first state.

In order to be able to transfer energy from the locking member 29 to the deployment guiding element 23, at least one of them extends in the transverse direction y of the hinge arrangement 11, such that the locking member 29 and the deployment guiding element 23 at least partly overlap when seen from above in the vertical direction z of the hinge arrangement 11, see FIG. 3, wherein the bracket portion 21 is removed for better visibility. They may e.g. look like a kind of X, when seen from above, by the locking member 29 and the deployment guiding element 23 intersecting each other. Such geometries of the deployment guiding element 23 and the locking member 29 are also efficient from a packaging point of view.

FIGS. 4a-4b illustrate the transition between the normal state, illustrated in FIGS. 2a and 2b, corresponding to the bonnet 5 being in the closed position, and the deployed state, illustrated in FIG. 4c, corresponding to the bonnet 5 being in the deployed position.

FIG. 4a illustrates a situation when a sensor system of the vehicle 3 has determined a collision with a vulnerable road user or an imminent collision with a vulnerable road user. The lifting member 53 has been activated and acts on the impact surface 51 of the locking member 29. Thereby, the locking member 29 is displaced from its first state described above in conjunction with FIG. 2a towards its second state. The lifting member 53 first rotates the locking member 29 to such a rotational position that the first hook 39 is moved away from the abutment 40 of the bracket portion 21, see FIG. 4a, and then the second hook 43 reaches the locking flange 45, see FIG. 4b. Thereafter, the first surface 49 of the elongated member 43 will slide against the locking flange 45 with the locking flange 45 being within the second hook 43, such that the first member 25 is in a secured position in relation to the body portion 18.

Once the locking flange 45 has reached into the second hook 43 and thereby secured the first member 25 in relation to the body portion 18, the lifting member 53 starts transferring deployment energy via the third leg-shaped portion 37 of the locking member 29 pushing on the deployment guiding element 23. The deployment guiding element 23 pivots at both its ends at the fifth and sixth pivot axes A5, A6, thereby raising the bracket portion 21 as a whole upwards and rearwards. At the same time, the locking flange 45 moves further into the second hook 43, until the locking flange 45 reaches a bottom 57 of the second hook 43, see FIGS. 4b and 4c. Since the locking flange 45 is retained within the second hook 43, the risk of bouncing back of the bonnet 5 is avoided or at least reduced.

Hence, the locking member 29 rotates independently at the start of the transition to the deployed state and the deployment guiding element 23 starts to rotate after having contact with the locking member 29, which is transferring the force from the lifting member 53.

A method of transiting the hinge arrangement described herein between the normal state and the deployed state may thus comprise first locking the first member 25 of the hinge portion 19 in relation to the body portion 18 by means of the locking member 29, thereafter translationally displacing the bracket portion 21 as a whole at least in the vertical direction z of the hinge arrangement 11 in relation to the first member 25 of the hinge portion 19.

FIG. 5 illustrates the hinge arrangement 11 during access opening of the bonnet 5. The bonnet is opened by rotation in the hinged connection. In the illustrated embodiment, the first member 25 of the hinge portion 19 is pivoted relative to the second members 27a, 27b by pivotal movement in the first, second, third and fourth pivot axes A1, A2, A3, A4 providing the hinged connection. The bracket portion 21 is meanwhile in a fixed position relative to the first member 25 of the hinge portion 19 during opening of the bonnet with the locking member 29 assuming its first state described above.

As described above, the relative movement within the hinge arrangement 11 during the transition of the hinge arrangement 11 to the deployed state, see FIGS. 4a-c, and the relative movement within the hinge arrangement 11 during access opening of the bonnet 5, see FIG. 5, are decoupled from each other.

As such, the present invention should not be considered as limited by the embodiments and figures described herein. Rather, the full scope of the invention should be determined by the appended claims, with reference to the description and drawings. Although the illustrated embodiments show a cover in the form of a bonnet 5 at a front end portion of a vehicle in the form of a car, the cover may also be comprised in another type of vehicle. Further, the cover may also be located at a rear end portion or a side end portion of the vehicle.

The invention claimed is:

1. A hinge arrangement adapted to be located at a front, a rear or a side end portion of a cover of a vehicle, said hinge arrangement being transitable between a normal state and a deployed state, said hinge arrangement having a longitudinal direction (x), a transverse direction (y) and a vertical direction (z), said hinge arrangement comprising
    a body portion, adapted to be attached, directly or indirectly, to a body of said vehicle or forming a part of said body,
    a bracket portion, adapted to be attached, directly or indirectly, to said cover,
    a hinge portion, providing a hinged connection between said body portion and said bracket portion, and
    a deployment guiding element,
    said hinge portion comprising a first member and a second member, said second member being pivotally connected to said first member and pivotally or fixedly connected to said body portion,
    said deployment guiding element pivotally connecting said bracket portion and said first member of said hinge portion,
    said bracket portion being arranged to be in a fixed position relative to said first member during movement in said hinged connection,
    said bracket portion being arranged to be translationally displaced as a whole at least in said vertical direction (z) in relation to said first member of said hinge portion during said transition of said hinge arrangement between said normal state and said deployed state, said deployment guiding element being adapted to guide said transition and said hinged connection being inactive during said transition, wherein,
    said hinge arrangement further comprises a locking member pivotally connected to said first member, said locking member being adapted to in a first state lock said bracket portion in relation to said first member of said hinge portion and in a second state lock said first member of said hinge portion in relation to said body portion,
    said deployment guiding element and said locking member being connected to said first member by means of a common pivot axis.

2. The hinge arrangement according to claim 1, wherein said deployment guiding element comprises a single arm, with a fixed length.

3. The hinge arrangement according to claim 1, wherein said locking member comprises a first lock portion adapted to cooperate with said bracket portion in said first state of said locking member.

4. The hinge arrangement according to claim 1, wherein said locking member is biased towards said first state.

5. The hinge arrangement according to claim 1, wherein said locking member comprises a second lock portion, adapted to cooperate with said body portion in said second state of said locking member to thereby prevent said first member from moving upwards in said vertical direction (z) in relation to said body portion.

6. The hinge arrangement according to claim 5, wherein said body portion comprises a locking flange protruding in said transverse direction (y), said second lock portion being adapted to cooperate with said locking flange.

7. The hinge arrangement according to claim 6, wherein said second lock portion comprises an elongated member having a first surface, said first surface being adapted to slide against said locking flange during said transition of said hinge arrangement between said normal state and said deployed state.

8. The hinge arrangement according to claim 1, further comprising a lifting member adapted to operate on said locking member to provide said translational displacement of said bracket portion at least in said vertical direction (z) in relation to said first member of said hinge portion during said transition of said hinge arrangement between said normal state and said deployed state.

9. The hinge arrangement according to claim 8, wherein said locking member comprises an impact surface, said lifting member being adapted to operate on said locking member by pushing on said impact surface.

10. The hinge arrangement according to claim 1, wherein said first member of said hinge portion comprises a support, said support being adapted to support said bracket portion in said first state of said locking member, at an end of said bracket portion.

11. The hinge arrangement according to claim 1, wherein said locking member and/or said deployment guiding element extend also in said transverse direction (y) of said hinge arrangement, such that said locking member and said deployment guiding element intersect each other or at least partly overlap, when seen from above in said vertical direction (z).

12. The hinge arrangement according to claim 1, wherein said first member comprises a stopper protruding in said transverse direction (y) of said hinge arrangement, said stopper being adapted to provide an end of said movement of said deployment guiding element at said transition of said hinge arrangement between said normal state and said deployed state.

13. A bonnet arrangement for a vehicle, said bonnet arrangement comprising
 a bonnet being displaceable between a closed position and
  a deployed position located at least upwards, preferably upwards and rearwards, as compared to said closed position, and
 a hinge arrangement according to claim 1,
 said bracket portion of said hinge arrangement being attached, directly or indirectly, to said bonnet, which constitutes said cover.

14. A vehicle comprising a hinge arrangement according to claim 1.

15. A method of transiting a hinge arrangement between a normal state and a deployed state, said method comprising
 providing the hinge arrangement of claim 1,
 first locking said first member of said hinge portion in relation to said body portion by means of said locking member,
 thereafter translationally displacing said bracket portion as a whole at least in said vertical direction (z) in relation to said first member of said hinge portion.

* * * * *